July 28, 1964 G. VON WRANAU 3,142,551
FURNACE FOR MANUFACTURE OF GLASS FIBERS
Filed July 6, 1959 4 Sheets-Sheet 4
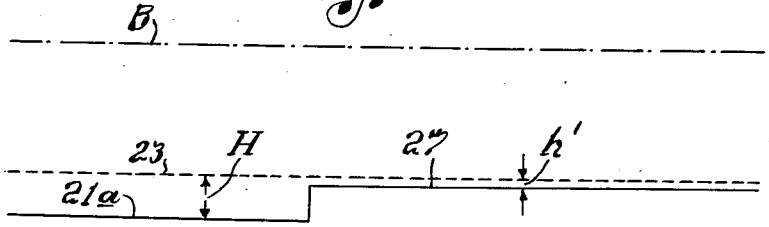
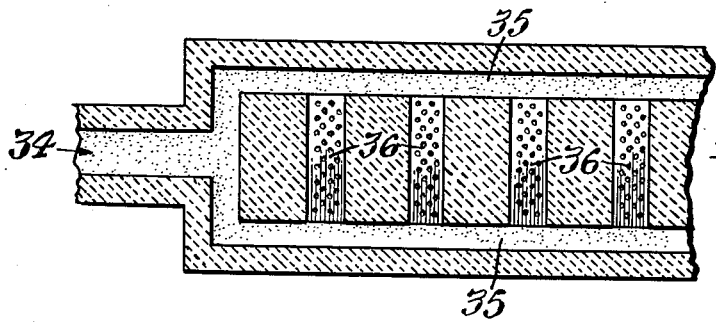
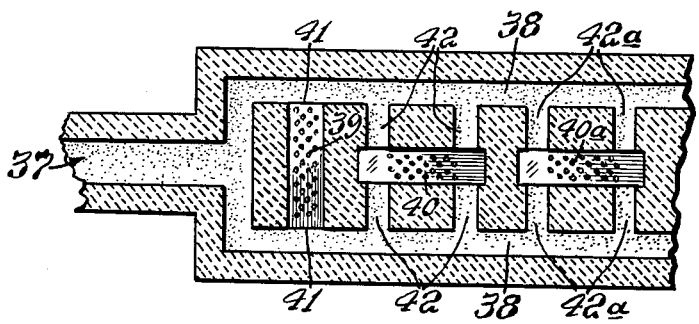
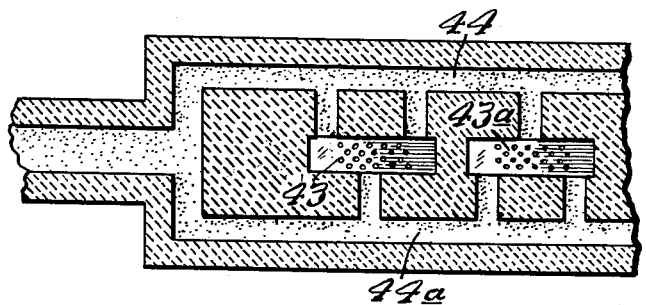
INVENTOR.
Guido von Wranau
BY United States Patent Office 3,142,551
Patented July 28, 1964

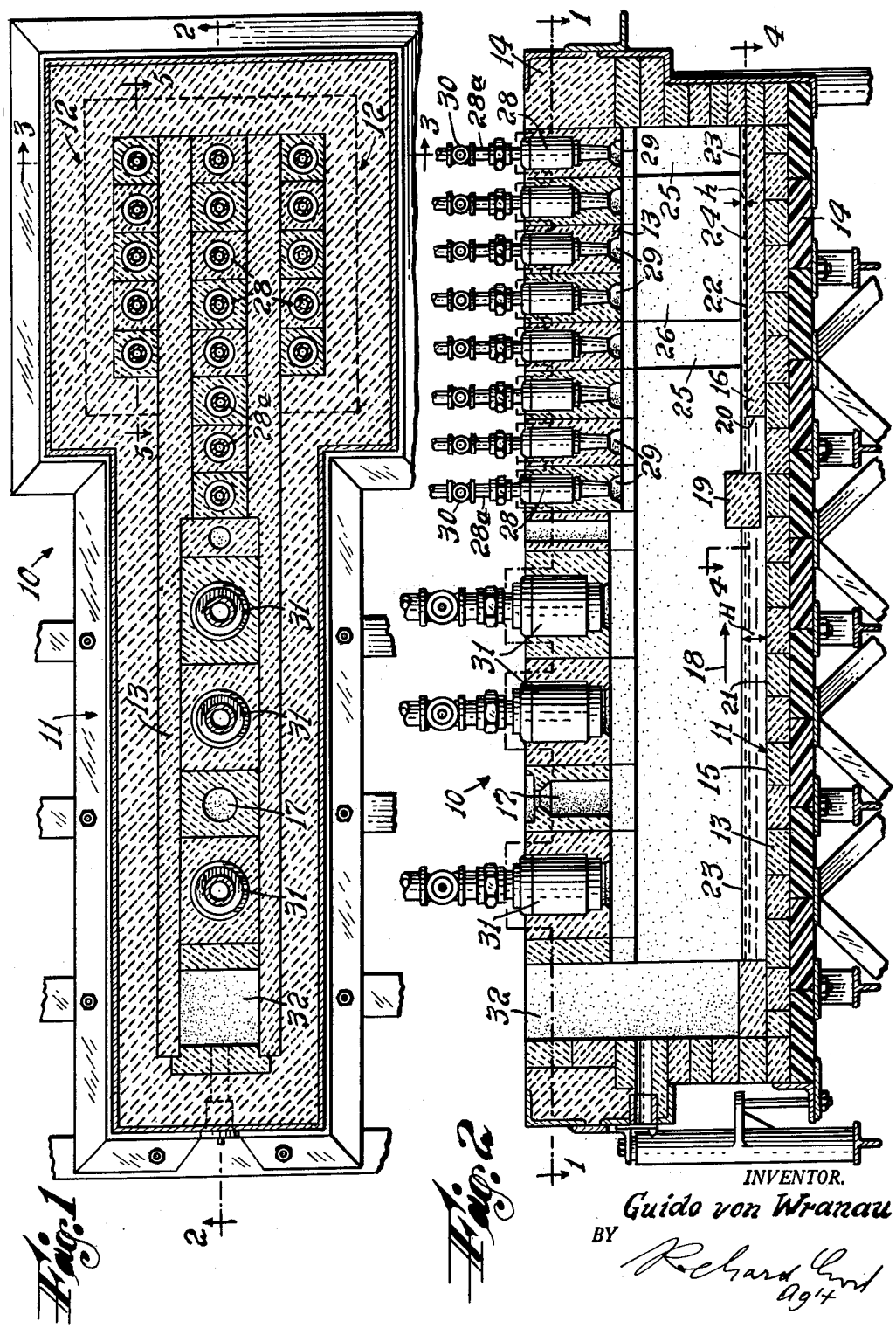

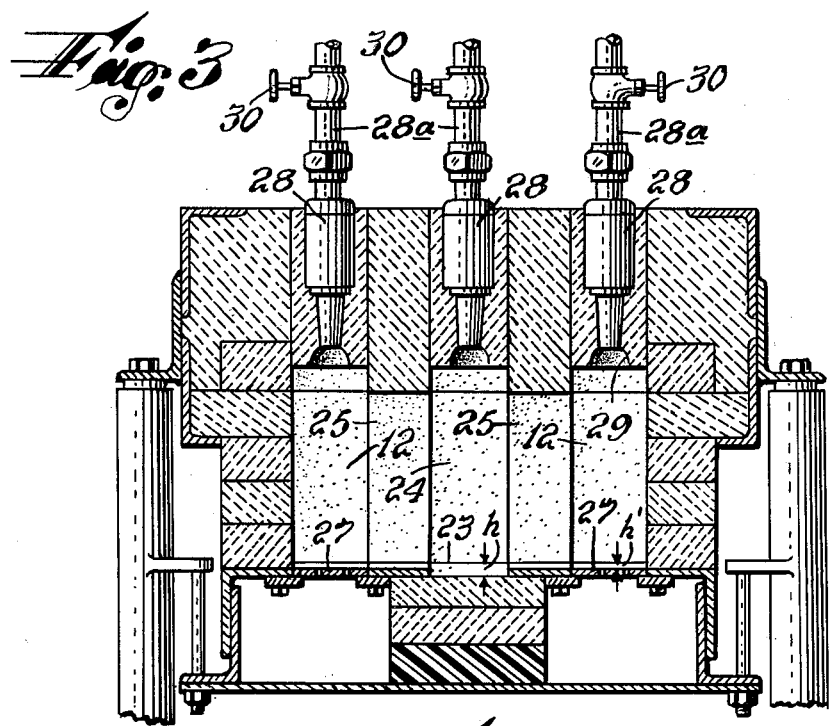
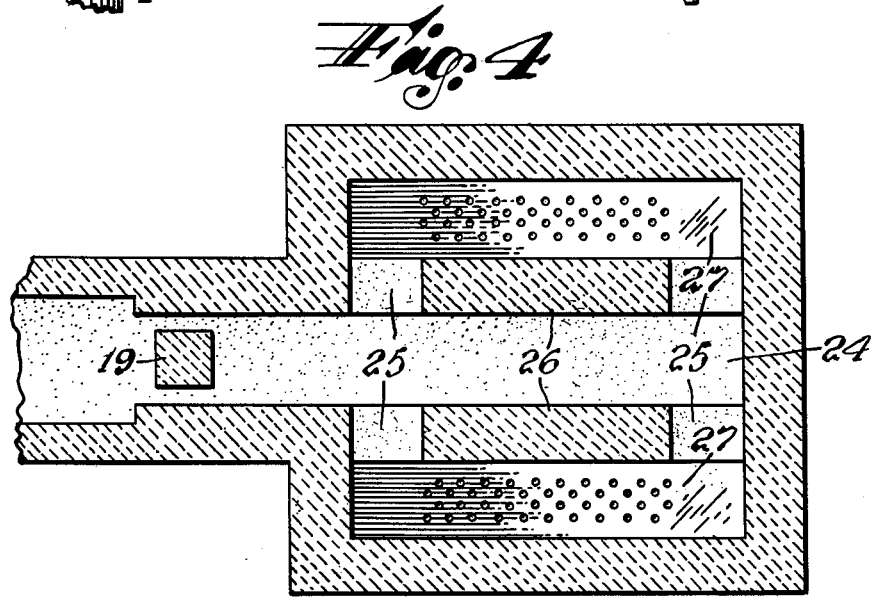

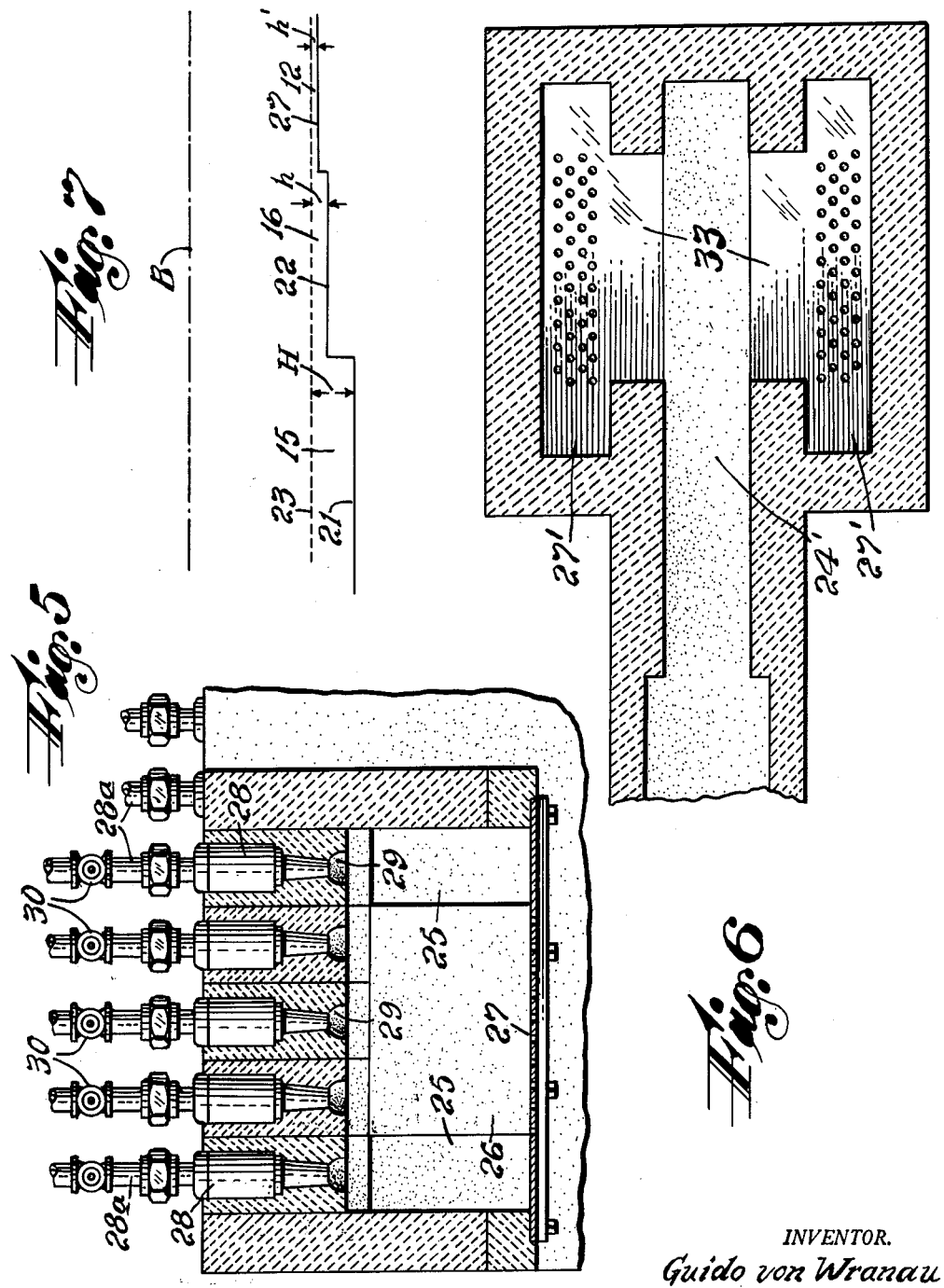

3,142,551
FURNACE FOR MANUFACTURE OF
GLASS FIBERS
Guido von Wranau, 247 E. 9th St., Plainfield, N.J.
Filed July 6, 1959, Ser. No. 824,977
3 Claims. (Cl. 65—1)

This invention relates to the art of making continuous glass fibers. By "continuous" glass fibers, filaments are meant which are continuously attenuated and wound on a reel so that they can be unwound and transferred to another reel to be processed to yarn, rovings, textiles, etc.

In apparatus for making continuous glass fibers, glass is melted, refined, and introduced into a feeder channel or forehearth to be fed to forming devices referred to as spinning plates or spinnerets.

The primary object of my present invention is to generally improve the manufacture of continuous glass fibers and, more particularly, to simplify and cheapen the manufacture.

The properties of glass fibers depend to a great extent upon the temperature and viscosity of the molten glass while being conveyed to the delivery zone, and especially while being in the latter. Glass within the delivery zones which will be referred to hereinafter as spinneret chambers must not be exposed to variations in temperature beyond the range of a very few degrees only. My invention aims, therefore, at reliably and uniformly maintaining the desired temperature in the spinneret chambers.

One object of this invention is to provide a glass furnace which will make it possible for the molten glass to stay in the furnace much more briefly, and leave the furnace more quickly, than was possible up to now. The invention aims at decreasing to a minimum the period of time, during which the molten glass is exposed to high temperatures. The terms "glass melting furnace," "glass furnace," and "furnace," as used in this specification and in the appended claims, are meant to comprise facilities for melting, refining, and conveying glass, and for drawing fibers.

In view of the object of the invention to expose molten glass to high temperatures as briefly as possible, it is another object of the invention to provide means which will reduce to a minimum the quantity of molten glass in the furnace, constituting the supply of molten glass for the fiber-drawing. Further, the invention provides to keep the body of glass in the furnace as shallow as possible.

Still another object of my present invention is to use radiant heat and to take advantage of the property of radiant heat when applied to glass bodies of small cross section or height.

The uniformity of glass fibers depending, as has been stated, on the accurate control of the temperature and viscosity of the glass, especially in the spinneret chambers, I make sure, according to the invention, that glass coming from the refining zone of the furnace and entering the spinneret chambers will not overheat a portion or portions of glass already in the spinneret chambers. It will be appreciated that fresh glass enters the spinneret chambers as glass is discharged in form of fibers.

This invention is primarily concerned with the manufacture of insoluble fibers from boro-silicate types of glass, and it is partly due to the volatility of molten boric acid that the invention provides means for holding in the furnace at any one time as little glass as possible, and for speeding up the travel of the glass through the furnace.

It is an object of the invention to provide a simplified furnace construction, and the achievement of this object is made possible since boro-silicates, as I have found, and as are described in my copending application Ser. No. 666,747, filed June 19, 1957, now abandoned, have a very low viscosity and refine most readily, when molten.

Further objects of my present invention center about a furnace construction whereby a single unit of facilities for melting, refining, and conveying glass can be combined with any number of fiber-drawing units.

To the accomplishment of the foregoing and other objects which will appear hereinafter, my invention consists in a method and an apparatus, as are more particularly described in the specification and sought to be defined in the claims.

Basically, the furnace of my invention comprises a continuous tank which serves to melt glass and to refine and convey the molten glass, and at least a single spinneret chamber that is associated with the tank to receive molten glass therefrom. There is a spinneret in the spinneret chamber, which spinneret is constituted by a metal plate provided with apertures through which, with a layer of molten glass above the spinneret, filaments are drawn by the rotation of drawing reels. My furnace includes heat-radiating means above the glass on the spinneret. According to the invention, the heat-radiating means and the spinneret are mounted, in relation to each other, so as to make sure that the radiant heat produced will heat the body of glass above the spinneret and, through said glass body, the spinneret itself,.

The invention provides further, broadly, that glass be melted and the molten glass be conveyed, while being refined, to spinneret chambers or fiber-drawing zones. I maintain a glass body of less height in the fiber-drawing zones than in the melting, and refining and conveying zones. Radiant heat is used at least in the fiber-drawing zones.

The specification is accompanied by drawings in which:

FIG. 1 is a horizontal section taken in the plane of the line 1—1 of FIG. 2, illustrating a glass furnace embodying features of the present invention;

FIG. 2 is a vertical section taken in the plane of the line 2—2 of FIG. 1;

FIG. 3 is a vertical section, drawn to enlarged scale, taken in the plane of the line 3—3 of FIG. 1;

FIG. 4 is a fragmentary horizontal section taken in the plane of the line 4—4 of FIG. 2, also drawn to enlarged scale;

FIG. 5 is a fragmentary vertical section taken in the plane of the line 5—5 of FIG. 1, drawn to enlarged scale;

FIG. 6 is a view similar to that of FIG. 4 but showing a modified furnace;

FIG. 7 is explanatory of the configuration of portions of a furnace bottom;

FIG. 8 is explanatory of the configuration of a modified furnace bottom;

FIG. 9 illustrates fragmentarily and schematically a furnace of the invention;

FIG. 10 illustrates a furnace modification; and

FIG. 11 illustrates a further furnace modification.

Referring to the drawings in greater detail, and initially to FIGS. 1 to 5, a glass furnace generally designated 10 includes a continuous tank 11 and two spinneret chambers 12, 12. Both the tank and the spinneret chambers are made of refractory material 13 and held in position by insulating linings or walls 14 and angle members fixed to side and end walls. The tank comprises a melting section 15, and a refining and conveying section 16.

In the furnace of my invention, melting, refining, and conveying are not strictly kept apart operations. The tank 11 serves as a place where the raw material is melted and the molten glass is refined and conveyed to the spinneret chambers 12, 12. It is provided that the refining may start where the melting is done and may continue until the glass is introduced into the spinneret chambers.

The raw material for the glass is fed through an opening 17 and melted in the tank section 15. The molten glass flows in the direction of the arrow 18 (see FIG. 2), that is, longitudinally of the tank 11, and while it flows through the tank, it becomes homogenized and refined. An underbridge 19 retains unrefined glass. The bridge 19 separates more or less the melting section 15 from the refining and conveying section 16.

At 20, the bottom of the tank forms a step (see FIG. 2). The tank bottom portion 21 on one side of the step is lower than the bottom portion 22 on the other side of the step. The numeral 23 indicates the level of the molten glass in the furnace. Considering the glass level 23 throughout the length of the furnace (see again FIG. 2), it will be seen that the height of the body of glass above the bottom portion 21, identified by H, is greater than that of the glass body above the bottom portion 22, designated $h$. In order that this bottom formation which forms a feature of the present invention may be fully appreciated, I mention, by way of example, the height H to be approximately 2 to 4 inches, and the height $h$ to be approximately 1 to 2 inches.

The two spinneret chambers 12, 12 shown to be of rectangular shape extend longitudinally of the furnace, with one chamber being lengthwise arranged on each side of the end portion or channel 24 of the tank 11. From FIG. 4, it will be seen that the channel 24 and each of the spinneret chambers communicate by means of two connections 25. Each pair of these connections is formed by the side walls of the furnace and a block 26.

Having now reference to FIG. 3, in the spinneret chambers 12, 12 spinnerets 27, 27 are shown to form the bottoms of the chambers. Observing the glass level 23, it will be apparent that due to the position of the spinnerets, the height of the glass in the spinneret chambers is smaller than the height $h$ of the glass in the channel 24, the height in the spinneret chambers being designated $h'$ (see FIG. 7). To be specific, the height $h'$ ranges approximately from ⅛ to ⅝ of an inch.

The configuration of the bottom of the furnace of FIGS. 1 to 5 is best shown in FIG. 7. The stepwise decrease in height of the glass mass, when looking from the melting station toward the fiber-drawing stations, can clearly be seen. The dash-dot-line B in FIG. 7 designates the plane in which heat-radiating means are mounted.

It is also within the scope of the invention to omit the step 20 and to provide a level bottom 21a throughout the tank (see FIG. 8) and to raise the bottom in the spinneret zones (spinnerets 27) only with respect to the level tank bottom. The invention provides further to arrange for more than one tank bottom step, for instance, two steps between the melting section 15 and the channel 24. A step in addition to the one designated 20 may be provided near the bridge 19.

The melting section 15 of the continuous tank 11 is heated to melt the glass, and the refining and conveying section is heated at a temperature at which the molten glass flows and refines. The temperature in the spinneret chambers allows fibers to be drawn. The heat used is radiant heat, preferably derived from a gaseous fuel mixture.

The refining and conveying section 16, including the channel or forehearth 24, is heated by radiant heat type burners 28, spacedly arranged along the longitudinal axis of the furnace and mounted in the roof of the furnace (see FIGS. 1 and 2). Each burner of the eight burners shown is sealed in a block of refractory material and is connected by a conduit 28a to a suitable supply source (not shown) of a suitable fuel mixture, for instance, a mixture of combustible gas and air. The fuel mixture is burned in radiators 29 which are embodied in the refractory material and constitute cup-shaped cavities in the refractory blocks. The radiant heat heats the interior walls of the tank and the entire body of glass in the refining and conveying section 16. Each conduit 28a is provided with a valve 30 or like organ to control the pressure and rate at which the gaseous fuel mixture is supplied, thus making it possible that each burner may be individually controlled and shut off, if desired. The burners are mounted to be rather close to the glass surface and to fully control the heat and viscosity of the glass. As an example, I mention a distance of approximately 4 to 5 inches between the burners (see the lines B in FIGS. 7 and 8) and the glass level 23.

The burners provided in each of the spinneret chambers are of identical constructions as those provided in the tank section 16. As an illustration, five burners are shown in each spinneret chamber.

The burners 31 provided in the melting section 15 of the tank 11 are essentially of the same construction as the burners 28, but are shown to be larger.

In operating the furnace of FIGS. 1 to 5, upon charging the furnace and lighting the burners, the raw material melts and flows, as has already been stated, in the direction of the arrow 18. When working with a glass of low viscosity, the molten mass will easily be refined and homogenized to be soon ready for the fiber-drawing operation. Combustion gases escape through flue 32 (see FIGS. 1 and 2).

It is an essential feature of this invention to heat the body of glass in each spinneret chamber, and through the glass the spinneret underneath. In applying radiant heat in the spinneret chambers to heat the body of glass above each of the spinnerets, as well as the spinnerets, I have found it advantageous to add glass-decolorizing metals or metal oxides to the raw material, for instance, selenium, selenium oxide, manganese, and others well known in the art of glass-making. The percentages in which such decolorants are used are well known. In the present case, the decolorizing is not done with a view to attaining colorless glass as the goal but to obtaining a glass of a high radiant heat transmission quality. I have observed that the efficiency of the radiant heat means is considerably increased when colorless or less colored glass is employed.

With the use of a two-level bottom in the continuous tank 11, as obtained by the provision of a step like the one designated 20 (see FIG. 2), it is possible to reduce the quantity of molten glass in the furnace, which has the great advantage of exposing only a small amount of glass to high temperatures. Also, when working according to the invention, the glass is, on an average, not longer exposed to high temperatures than approximately 6 hours. It will be apparent that the reduction in the amount of glass to be heated, and in the time during which the heating occurs, is, from an economic point of view, also most desirable.

When the glass arrives at the spinneret chambers, it is completely refined and homogenized. In FIG. 4, the glass is shown to enter the spinneret chambers 12, 12 through the connections 25, 25.

From FIGS. 2, 3, and 7, it will be seen that the body of glass in the spinneret chambers is a very small height, compared with the height of the glass body in the melting section 15. The small height $h'$ permits the radiant heat type burners used, as has been indicated, to heat the glass body throughout, as well as the spinnerets 27 below. There is no need for separately heating the spinnerets, for instance, electrically.

In FIG. 6, a modification is shown according to which the spinneret chambers 27', 27' and the channel or forehearth 24' are connected across wide openings 33, 33. Such wide openings just as the double connections shown in FIG. 4 ensure that glass entering the spinneret chambers does not influence the temperature, and does not upset the uniformity of the temperature, in the spinneret chambers.

The furnace shown in FIG. 9 includes a tank 34 terminating into two branches 35. Between the latter, there are four spinneret chambers 36 which extend perpendicularly, and are endwise connected, to the branches.

In the furnace construction of FIG. 10, a tank 37 has two branches or forehearths 38, between which there are three spinneret chambers 39, 40, 40a. The chamber 39 extends perpendicularly to the branches 38 and is connected endwise thereto at 41, 41. The spinneret chambers 40, 40a are connected to the branches by connections 42, 42, 42, 42 and 42a, 42a, 42a, 42a.

Whenever hereinafter mention is made of "channels" and "branches," the terms are meant to cover the part of a furnace, into which molten glass is introduced from the glass-melting tank and which is generally referred to as a forehearth.

In FIG. 11, each of the two spinneret chambers 43, 43a is connected to the branches 44, 44a by three connections, two connections on one side and one connection on the other appearing reversed in the two cases.

It is believed that the method of my invention, as well as the construction and operation of the forms of apparatus for practicing the invention, and the many advantages thereof, will be fully understood from the foregoing detailed description thereof. Some of the features and advantages are briefly reviewed hereinafter. In the spinneret chambers, radiant heat is used to heat the bodies of glass and the spinnerets underneath as well. Thus, my invention does away with electrically heated spinning plates as were used up to now. In aiming at a reduction of the quantity of glass in the furnace at any one time, and of the period of time, during which glass is exposed to high temperatures, a very shallow mass of glass is moved through the furnace. To reduce the shallow body of glass appearing in the melting zone still further, I provide steps in the furnace bottom, and arrange the spinnerets in the spinneret chambers, so as to arrive at a height of the glass body in the spinneret chambers of only about 1/8 to 5/8 of an inch. To ensure uniform temperatures in the spinneret chambers, I provide that fresh glass is fed to the chambers in at least two places or along the length of a side of the spinneret chamber. My furnace permits the use of any number of spinnerets, whereby the present construction does not require glass to flow lengthwise through a spinneret chamber before it enters another spinneret chamber. Instead, glass enters the spinneret chambers of my furnace either along the whole length of the chamber or simultaneously through two ports at or near both ends of the chambers. In preferably using low melting borosilicate glass, I was able to construct a compact furnace in which a continuous tank serves to melt glass and to refine and convey molten glass. If desired, I build the furnace so as to make the lower portion which defines the melting, refining and conveying, and delivery (spinneret) zones replaceable. It is the lower portion that is exposed to the corroding action of molten glass and thus can easily be replaced. In the case of low melting borosilicate glasses, the lower furnace portion may be lined with metal linings withstanding the temperatures used.

It will be apparent that while I have shown my invention in a few preferred forms only, many changes and modifications may be made without departing from the spirit of the invention defined in the following claims.

I claim:

1. Furnace for the manufacture of glass fibers, comprising a tank for melting raw material for glass and for refining and conveying molten glass, at least a single spinneret chamber, and at least a single spinneret, said tank including a first and second section, said first and second sections communicating with each other, said first section serving primarily said melting purpose, said second section being constituted by at least two forehearths and serving primarily said refining and conveying purposes, said forehearths extending in a spaced relationship away from said first section, said spinneret chamber being disposed between said forehearths, said spinneret being disposed in said chamber for flowing streams of molten glass, said furnace further comprising passageways connecting said spinneret chamber and each of said forehearths.

2. In the furnace according to claim 1, said forehearths extending in a substantially parallel relationship, a plurality of spinneret chambers of elongated shape, said spinneret chambers extending from one of said forehearths to the other.

3. In the furnace according to claim 1, said forehearths extending in a substantially parallel relationship, a plurality of spinneret chambers of elongated shape, extending substantially parallel to said forehearths.

References Cited in the file of this patent

UNITED STATES PATENTS

| 1,579,353 | Good | Apr. 6, 1926 |
| 1,611,328 | Arbogast | Dec. 21, 1926 |
| 1,906,695 | Lufkin | May 2, 1933 |
| 2,133,236 | Slayter et al. | Oct. 11, 1938 |
| 2,194,814 | Stewart | Mar. 26, 1940 |
| 2,219,346 | Thomas et al. | Oct. 29, 1940 |
| 2,220,433 | Wellech | Nov. 5, 1940 |
| 2,257,767 | Slayter et al. | Oct. 7, 1941 |
| 2,267,019 | Esser | Dec. 23, 1941 |
| 2,396,585 | Long | Mar. 12, 1946 |
| 2,453,864 | Schler | Nov. 16, 1948 |
| 2,482,071 | Simison | Sept. 13, 1949 |
| 2,593,197 | Rough | Apr. 15, 1952 |
| 2,618,906 | Hess | Nov. 25, 1952 |
| 2,714,622 | McMullen | Aug. 2, 1955 |
| 2,808,446 | Lambert | Oct. 1, 1957 |
| 2,929,675 | Von Wranau et al. | Mar. 22, 1960 |
| 2,949,633 | Drummond et al. | Aug. 23, 1960 |

FOREIGN PATENTS

| 689,297 | Great Britain | Mar. 25, 1953 |

OTHER REFERENCES

Germany, DAS 1,018,594, October 31, 1957.